(12) United States Patent
Chen et al.

(10) Patent No.: US 7,980,472 B2
(45) Date of Patent: Jul. 19, 2011

(54) DATA CONVERTER AND ITS CONVERTING METHOD

(75) Inventors: Hui-Chuan Chen, Hsinchu (TW); Chen-Ying Kao, Hsinchu (TW); Hong-Ming Kuo, Hsinchu (TW)

(73) Assignee: Institute of Transportation, Ministry of Transportation and Communications Taiwan R.O.C., Taipei (TW)

( * ) Notice: Subject to any disclaimer, the term of this patent is extended or adjusted under 35 U.S.C. 154(b) by 319 days.

(21) Appl. No.: 12/192,276

(22) Filed: Aug. 15, 2008

(65) Prior Publication Data

US 2010/0038428 A1   Feb. 18, 2010

(51) Int. Cl.
  *G02B 26/10*   (2006.01)
  *G06K 7/10*    (2006.01)
  *G06K 9/22*    (2006.01)
  *G06K 19/06*   (2006.01)

(52) U.S. Cl. .............................. 235/462.25; 235/462.46

(58) Field of Classification Search ............. 235/462.25, 235/462.46, 472.02
  See application file for complete search history.

(56) References Cited

U.S. PATENT DOCUMENTS

| 6,758,403 B1* | 7/2004 | Keys et al. ............... 235/462.45 |
| 2005/0018873 A1* | 1/2005 | Rhoads ....................... 382/100 |
| 2005/0262548 A1* | 11/2005 | Shimojo et al. ............... 725/135 |
| 2006/0088166 A1* | 4/2006 | Karusawa ..................... 380/277 |
| 2007/0273519 A1* | 11/2007 | Ichikawa et al. ............ 340/572.1 |
| 2008/0300006 A1* | 12/2008 | Rofougaran et al. ....... 455/552.1 |

* cited by examiner

*Primary Examiner* — Edwyn Labaze
(74) *Attorney, Agent, or Firm* — WPAT, PC; Justin King

(57) ABSTRACT

A data converter and its converting method having both the functions of barcode technology and RFID technology, and conforming with related regulations of international civil aviation are disclosed. The data converter includes a barcode reading module, a processing module, and a reading module. The converting method includes the following steps: (1) Reading an external barcode data $S_{BC}$ by the barcode reading module; (2) Reading the external barcode data $S_{BC}$ read by the barcode reading module by the barcode reading module from a memory; (3) Reading the date data (preset data $S_P$) from the RTC (Real Time Clock) by the processing module; (4) Reading the data arrangement format defined within the firmware by the processing module; (5) Combining the external barcode data $S_{BC}$ and the preset data $S_P$ in accordance with the arranged format by the processing module; (6) Writing the combined data into a register memory by the processing module; (7) Starting the RFID module by the processing module; (8) Reading the combined data from the register memory by the processing module and writing into the RFID medium memory through the RFID module.

2 Claims, 2 Drawing Sheets

DATA CONVERTER AND ITS CONVERTING METHOD

BACKGROUND OF THE INVENTION

1. Field of the Invention

The invention relates to a data converter and its converting method, and more particularly, to a data converter and its converting method that applies to the air transport and has the functions by employing both the barcode technology and the RFID technology while conforming with the relevant codes and recommendations of regulations of international civil aviation used in the operation of the consigned shipment of the passenger's luggage for converting the external barcode data.

2. Description of the Prior Art

Following the improvement of the optical encoding technology, the optical encoding information have become very popular, among them, the barcode is the one that is most commonly used. The barcode is a technology employed to substitute keyboard for digital and literal input into the computer. In other words, one is able to have the digital and literal input into the computer directly through the scanning of the barcode without the necessity of pressing the keyboard. The purpose of barcode design is to execute the stock-in and stock-out control of the article, the statistics of the location and quantity of depositing the article to facilitate the management personnel for performing the inquiry and control on the logistic status of the article.

Currently, most of the air transport enterprises still employ the barcode technology for identifying the data relevant to the passenger's luggage. As the passenger checks in at the airline counter, the counter personnel will immediately provide the barcode data for the passenger. The barcode data, besides being able to be printed on the sticker, are able to be transmitted to the data information center (e.g. the SITA company, name of a company providing data information service). The data information center will collect all the barcode data transmitted by the airline companies and plan as a whole. However, the airline company needs to increase the cost required by the management since the airline company has to obtain the relevant data of a certain luggage through the information service center.

The relations between the prior arts known by the applicant and the invention are depicted as follows:

1. Taiwan patent made public No. 200636600 on Oct. 16 of 2006—"Combined Barcode Scanner and Radio Frequency Identification Reader with Field Interpretation Array"

The invention patent of the prior art providing a combined barcode scanner and radio frequency identification reader includes a microprocessor control unit, an RFID module, a barcode scanning module, a host computer interface, and a user interface.

Both the invention patent of the prior art and the invention have the bar-code device and the RFID device integrated to a single hardware device. However, both the bar-code device and the RFID device of the invention patent of the prior art are independent actions, the invention patent of the prior art is unable to perform the action that after reading the barcode data by the barcode device, it is capable of automatically converting into the RFID electronic tag data and writing into the electronic tag through the RFID device, what is more, its RFID portion is a read-only structure. Therefore, the invention patent of the prior art is capable of performing hardware integration only and is unable to achieve information integration. This is the demerit of the invention patent of the prior art.

2. U.S. Pat. No. 7,055,750 B2 (Jun. 6, 2006)—"Device and Method for Encoding Data in Multiple Media";

The invention patent of the prior art provides a system and device capable of converting from a certain data format into another data format. The data format includes barcode format and RFID electronic tag format. The system including a barcode reader is capable of using in reading the barcode data and automatically writing the barcode data into the RFID electronic tag. Besides being capable of reading the RFID electronic tag data and automatically converting into barcode data, it is capable of printing out through the barcode printer too.

Although the invention patent of the prior art is capable of using in the data conversion between the barcode device and the RFID device (i.e. to convert the barcode into the RFID or to covert the RFID into barcode), the data content are not changed. Therefore, the invention patent of the prior art does not have the function of data reprocessing, thereby is not capable of using as the security tracing of the luggage for the air transport. This is the demerit of the invention patent of the prior art.

3. U.S. Pat. No. 7,114,654 B2 (Oct. 3, 2006)—"RFID Encoder and Verifier;

The invention patent of the prior art provides an RFID reading and writing system combining a barcode printing and application system. The RFID reading and writing system is capable of verifying if the writing-in of the tag and the printing-out of the barcode are correct before the tag is used to stick on the consigned shipment luggage or articles.

Similar to the foregoing U.S. invention U.S. Pat. No. 7,055, 750 B2 depicted in item no. 2, the invention patent of the prior art is capable of using in the data conversion between the barcode device and the RFID device (i.e. to convert the barcode into the RFID or to covert the RFID into barcode), the data content are not changed. Therefore, the invention patent does not have the function of data reprocessing, thereby is not capable of using as the security tracing of the luggage for the air transport. This is the demerit of the invention patent of the prior art.

4. China Utility Model No. ZL200520108771.9 (Jul. 26, 2006)—"Data Reading Device"

The invention patent of the prior art provides a palm top digital reading device that is capable of reading the barcode and the RFID tags respectively and start the barcode reader or the RFID electronic tag reader in accordance with the pressing location of the key pressing switch.

Similar to the foregoing Taiwan invention patent No. 200636600 depicted in item 1, both the invention patent of the prior art and the invention have the bar-code device and the RFID device integrated to a single hardware device. However, both the bar-code device and the RFID device of the invention patent of the prior art are independent actions, the invention patent of the prior art is unable to perform the action that after reading the barcode data by the barcode device, it is capable of automatically converting into the RFID electronic tag data and writing into the electronic tag through the RFID device, what is more, its RFID portion is a read-only structure. Therefore, the invention patent of the prior art is capable of performing hardware integration only and is unable to achieve information integration. This is the demerit of the invention patent of the prior art.

SUMMARY OF THE INVENTION

The invention is a patent application to accommodate "antecedent accreditation project of passenger's luggage security—an RFID air transport application in the year of 2006" of the Institute of Transportation, Ministry of Transportation and Communications. Before the establishment and full enforcement of introducing the RFID technology into the consigned shipment operation of passenger's luggage security, the "luggage barcode system" currently used in the consigned shipment operation of passenger's luggage needs to be retained. Employing both the "barcode technology" and the "RFID technology", the invention develops a data converter having the functions of both the barcode technology and the RFID technology while conforming with the relevant codes and recommendations of regulations of international civil aviation used in the operation of the consigned shipment of the passenger's luggage. Therefore, the invention makes the consigned shipment operation service of passenger's luggage of air transport more secure and convenient.

In light of the above-mentioned demerits of the prior art, the primary objective of the invention is to provide a data converter including a barcode reading module for reading an external barcode data $S_{BC}$, a processing module performing combination and processing with respect to the external barcode data $S_{BC}$ and a preset data $S_P$ for generating a data $S_D$, and a writing module to have the data $S_D$ save in an external medium memory in a mode of wireless radio frequency.

In an embodiment of the invention, the external medium memory is an RFID tag.

In another embodiment of the invention, the data converter further includes an extended interface for providing the processing module with the preset data $S_P$.

In a further embodiment of the invention, the preset data $S_P$ is a time data provided by an Real Time Clock (RTC).

In one more embodiment of the invention, the extended interface is an RS232 (Recommended Standard 232) or a USB (Universal Serial Bus).

The invention also provides a data converting method of the data converter including the following steps:
1. Reading the barcode data and saving in register memory by the use of barcode reading module;
2. Reading the data read by the barcode reading module from the memory by the use of processing module;
3. Reading the date data (preset data) from RTC by the use of processing module;
4. Reading the data arrangement format defined within the firmware by the use of processing module:
5. Having the barcode data and the preset data perform permutation and combination in accordance with the format by the use of processing module;
6. Having the combined data write into the register memory by the use of processing module;
7. Starting the RFID writing module by the use of processing module;
8. Reading the combined data from the register memory and writing into the RFID medium memory through the RFID writing module by the use of processing module.

In an embodiment of the invention, the external medium memory is an RFID tag.

EFFICACIES OF THE INVENTION

Based on the discrepancy between the invention and the prior arts, the invention is capable of generating at least the following efficacies:
1. The invention possesses both the functions of the "Barcode Technology" and the "RFID Technology";
2. Both the architectures of the input of the "barcode data" and the output of the "RFID data", after the conversion through the data converter, is capable of conforming with the requirements of the RP1740C of the PSCRM (Passenger Service Conference Resolution Manual) of the IATA (International Air transport Association);
3. Besides being able to provide LSN (License Plate Number) of the luggage sticker, the invention is capable of providing other visual data that conform with the requirements of IATA, e.g. airline flight number, airline flight schedule, name of passenger, airline departure place and destination;
4. The invention is capable of modifying and extending through a firmware or connecting to other system such as PC (Personal Computer) to strengthen the content of data conversion. What is more, the invention is capable of further applying to the converting requirements of "barcode data" and "RFID data" in the field such as "future warehouse".

The accomplishment of this and other objectives of the invention will become apparent from the following description and its accompanying drawings of which:

DETAILED DESCRIPTION OF THE PREFERRED EMBODIMENT

Figure 1:
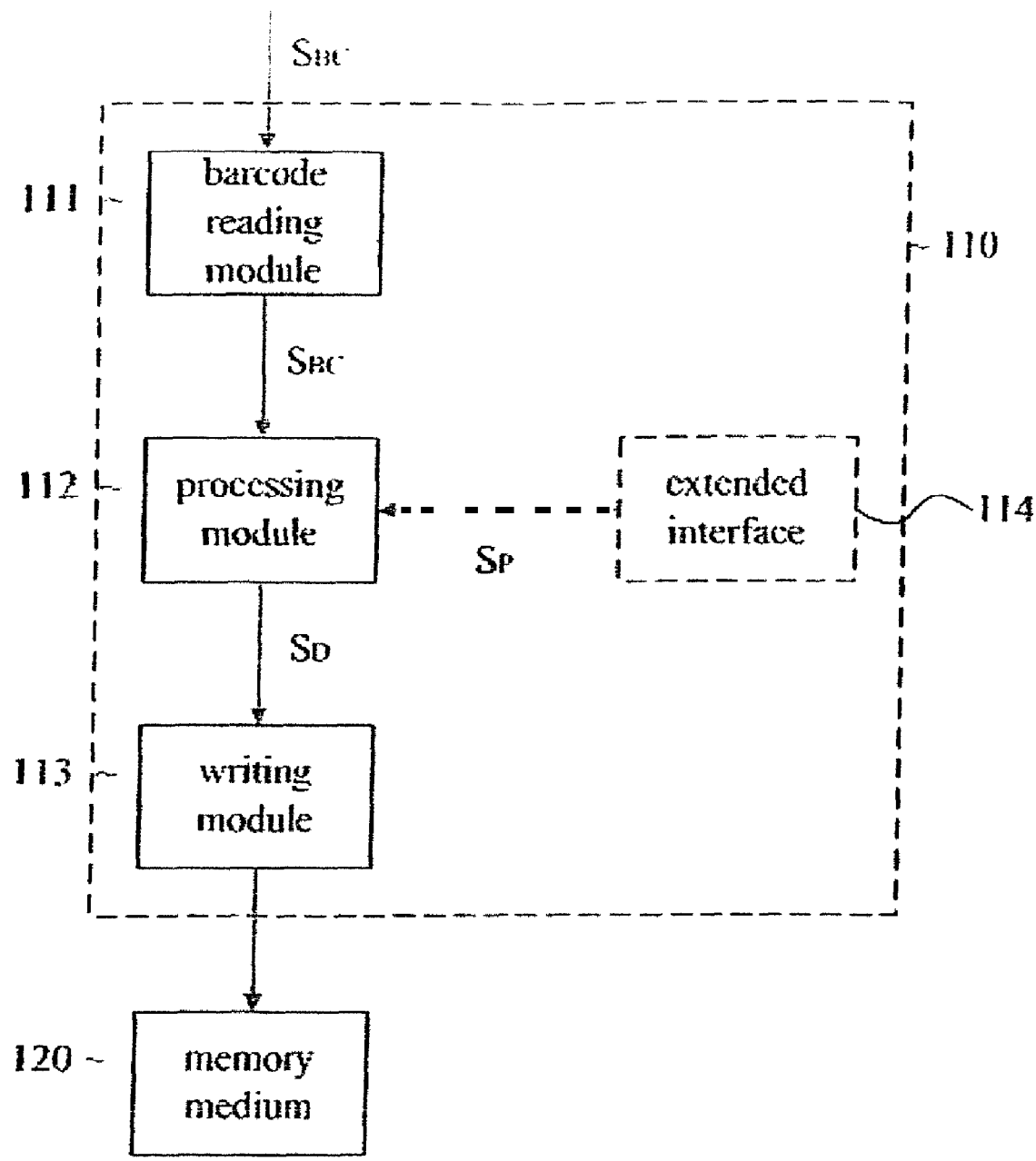
FIG. 1 is an embodiment of the data converter of the invention.

FIG. 1 is an embodiment of the data converter of the invention. As shown in FIG. 1, the data converter (110) includes a barcode reading module (111), a processing module (112), and a writing module (113). The barcode reading module (111) reads an external barcode data $S_{BC}$ and provides the processing module (112) with the external barcode data $S_{BC}$. The processing module (112) performs the action of combination and processing with respect to the external barcode data $S_{BC}$ and a preset data $S_P$ for generating a data $S_D$. Afterwards, the writing module (113) has the data $S_D$ store in an external medium memory (120).

The preset data $S_P$ can store in the processing module (112) or in a memory module (not shown in the Figure) or be provided by an extended interface (114). The user can make use of the extended interface (114) to have the preset data SP input into the processing module (112). The extended interface (114) can be an RS232 (Recommended Standard 232 or a USB (Universal Serial Bus). In another embodiment, the preset data $S_P$ can be time data provided by an RTC (Real Time Clock) (not shown in the Figure). The user can also make use of the extended interface (114) to modify the mode of processing the external barcode data $S_{BC}$ and the preset data $S_P$ by the processing module (112).

The data converter (110) processes the external barcode data $S_{BC}$ and has the processed data write into a medium memory (120) through a cable or by the use of a wireless mode. In an embodiment of the invention, the medium memory (120) can be an RFID tag since the non-contact type of RFID (Radio Frequency Identification) is gradually employed in the air transport enterprise. Therefore, the data converter (110) has the processed data save in the RFID tag in the wireless mode. The data converter (110) not only can be applied in air transport enterprise, it can be applied in land transport as well.

For example, when a passenger checks in his/her luggage at the airline counter, the counter personnel will generate a barcode sticker in accordance with some basic data such as departure place, destination, airline flight number etc. and have the barcode sticker stick to the luggage. In order to stay away from the RFID technology already used by some airports, one can makes use of the data converter (110) for processing the barcode data on the luggage and saving the result processed in the RFID tag.

When it comes to the situation that both the RFID tag and the barcode sticker are provided on the luggage, the personnel at the counter can make use of the facility (barcode reader or RFID reader) possessed by itself to read the relevant data provided on the luggage. This is because that the data converter (110) is capable of generating new data in accordance with the barcode data already have and saving the data in the RFID tag. What is more, the counter personnel is capable of acquiring the required data directly from the RFID tag without asking the information service center e.g. SITA (the name of a company providing information service) for relevant luggage data since the data converter (110) is capable of saving the above-mentioned data in the RFID tag, thereby the invention is capable of greatly lowering the management cost.

Figure 2:
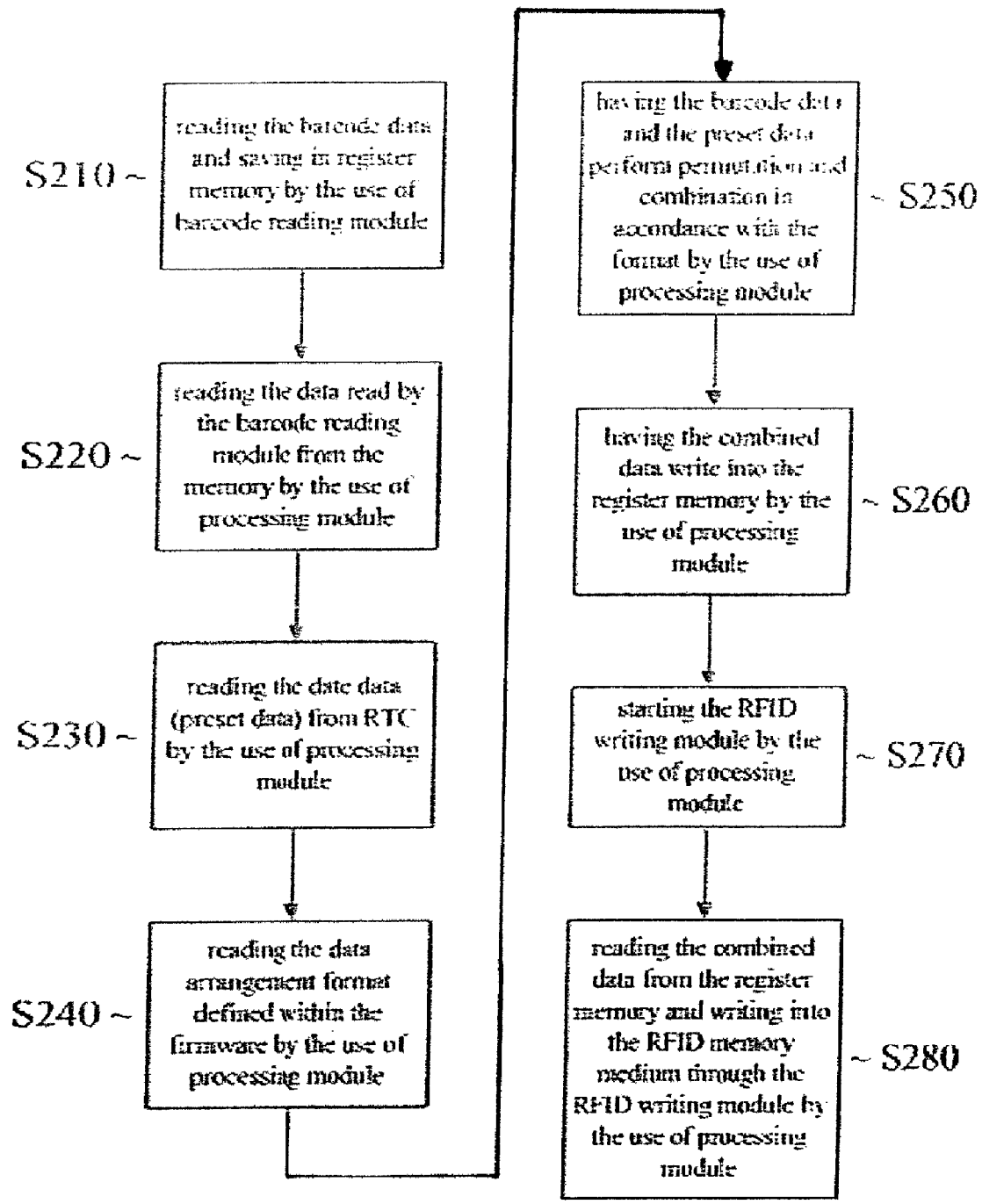
FIG. 2 is the flow chart of the converting method of the data converter of the invention.

FIG. 2 is the flow chart of the converting method of the data converter of the invention. As shown in FIG. 2, first of all, reading an external barcode data $S_{BC}$ and saving the external barcode data $S_{BC}$ in a register memory (not shown in the Figure) by the use of barcode reading module (111) (Step S210). As the passenger checks in at the airline counter, a barcode sticker will be printed by the airline company and have the barcode sticker stick on the passenger's luggage. In the present embodiment, the barcode data $S_{BC}$ on the luggage are read by the use of the barcode reading module (111) shown in FIG. 1. The external barcode data $S_{BC}$ can be the ones with 10-digit data representing the airline company or series number etc.

Thereafter, the processing module acquires the external barcode data $S_{BC}$ from the register memory (Step S220), and afterwards, acquires a preset data $S_P$ (Step S230). In an embodiment of the invention, the preset data $S_P$ is provided by the extended interface (114) while in another embodiment, the preset data $S_P$ can be the ones stored in the register memory (not shown in the Figure) beforehand or the time data provided by the Real Time Clock (RTC). Subsequently, the processing module (112) further reads in the data arrangement format defined within the firmware (Step S240) and has both the external barcode data $S_{BC}$ and the preset data $S_P$ perform combining action and processing in accordance with the data arrangement format (Step S250) for generating a data $S_D$. In order to conform with the regulation of the International Air Transport Association (IATA), the data $S_D$ can be the ones with 13-digit data. In the present embodiment, one can also make use of the extended interface (114) to change the mode of processing the external barcode data $S_{BC}$ and the preset data $S_P$ by the processing module (112). Subsequently, the processing module (112) has the data $S_D$ write into the register memory (Step S270). Lastly, read the data $S_D$ in the register memory and have the data $S_D$ write into the medium memory (120) (Step S280).

Referring again to FIG. 1, the writing module (113) has the data $S_D$ write into the medium memory (120). The medium memory (120) can be an RFID tag for receiving the data $S_D$ in wireless mode. When it comes to the situation that both the RFID tag having the data $S_D$ and the barcode tag disposed concurrently on the passenger's luggage, the invention is capable of reading the relevant data on the luggage regardless whether the airport has the barcode-tag reading facility only or has the RFID-tag reading facility only. In addition, when the airline counter at the airport reads the relevant data on the luggage through the RFID tag, the management cost can be greatly lowered since it does not need to acquire data through the information service center, The above-mentioned data information shown in FIG. 2 and provided by the use of RTC is a visual information that conforms with the requirements of IATA. Similarly, other visual information conforming with the requirements of IATA such as airline flight number, name of the passenger, departure place, and destination etc. can be connected to an external system or a computer (not shown in the Figure) through the extended interface (114) for acquiring the relevant preset data $S_P$. However, although the technology of the foregoing prior arts can be used in the data conversion between the barcode device and the RFID device, they can only be used in the conversion of the data format, the content of the data is unchanged. Therefore, the patents of the prior art possess no functions of reprocessing, thereby are unable to be applied in tracing the security of the luggage of air transport. This is the disadvantage of the prior arts. The invention, besides being able to provide LSN (License Plate Number) of the luggage sticker, is capable of providing other visual data that conform with the requirements of IATA, e.g. airline flight number, airline flight schedule, name of passenger, airline departure place and destination. This is the advantage of the invention.

It will become apparent to those people skilled in the art that various modifications and variations can be made to the device and method of the invention without departing from the scope or spirit of the invention. In view of the foregoing description, it is intended that all the modifications and variation fall within the scope of the following appended claims and their equivalents.

What is claimed is:
1. A data converter comprising:
   (a) a barcode reading module for reading an external barcode data $S_{BC}$;
   (b) a processing module for having the external barcode data $S_{BC}$ and a preset data $S_p$ perform combination and processing to generate a data $S_D$; and
   (c) an RS232 (Recommended Standard 232) or a USB (Universal Serial Bus) extended interface for providing the processing module with the preset data $S_p$; and
   (d) a writing module for having the data $S_D$ store within an external medium memory in wireless mode utilizing an RFID;
   wherein the preset data $S_p$ is a time data provided by the Real Time Clock (RTC).
2. A converting method of the data converter comprising the following steps:
   (1) Reading the barcode data and saving in register memory by the use of barcode reading module;
   (2) Reading the data read by the barcode reading module from the register memory by the use of processing module;
   (3) Reading the date data (preset data) from RTC by the use of processing module;
   (4) Reading the data arrangement format defined within the firmware by the use of processing module;
   (5) Having the barcode data and the preset data perform permutation and combination in accordance with the format by the use of processing module;
   (6) Having the combined data write into the register memory by the use of processing module;
   (7) Starting the RFID writing module by the use of processing module; and
   (8) Reading the combined data from the register memory and writing into an external RFID medium memory through the RFID writing module by the use of processing module.

* * * * *